United States Patent [19]

Minami et al.

[11] Patent Number: 5,040,768

[45] Date of Patent: Aug. 20, 1991

[54] POWDERY ARTICLE SUPPLY VALVE MECHANISM

[75] Inventors: Nagio Minami; Tamotsu Oka, both of Hiroshima, Japan

[73] Assignee: Mitsubishi Jukogyo Kabushiki Kaisha, Tokyo, Japan

[21] Appl. No.: 459,350

[22] Filed: Dec. 29, 1989

[30] Foreign Application Priority Data

Jan. 13, 1989 [JP] Japan .................................. 1-2122[U]

[51] Int. Cl.⁵ ........................................... F16K 31/124
[52] U.S. Cl. ....................................... 251/63.6; 92/13;
 92/13.41
[58] Field of Search ....................... 92/13, 13.3, 13.41,
 92/13.7; 251/62, 63, 63.5, 63.6

[56] References Cited

U.S. PATENT DOCUMENTS

| | | | |
|---|---|---|---|
| 2,899,168 | 8/1959 | Kleczek | 251/63.5 |
| 3,317,179 | 5/1967 | Willis | 251/58 |
| 3,440,933 | 4/1969 | Sutton | 92/13.7 |
| 3,568,976 | 3/1971 | Thumm | 251/63.6 |
| 3,739,693 | 6/1973 | Puster | 92/13.3 |
| 4,033,863 | 7/1977 | Stone | 251/63.6 |
| 4,094,231 | 6/1978 | Carr | 92/13.41 |
| 4,180,239 | 12/1979 | Valukis | 251/63.5 |
| 4,421,292 | 12/1983 | Matsui et al. | 251/63.6 |
| 4,583,568 | 4/1986 | Yamakawa et al. | 251/58 |
| 4,739,964 | 4/1988 | Hutt | 251/63.6 |

FOREIGN PATENT DOCUMENTS 45-20612 8/1970 Japan .
61-2562 1/1986 Japan .

Primary Examiner—George L. Walton

[57] ABSTRACT

A powdery material supply valve mechanism including a valve means disposed in front of a piston rod means in a longitudinally aligned relationship with each other, a valve housing means incorporating operatively the valve means and the piston rod means therein and a valve cylinder/piston means. This valve cylinder means is disposed shiftably in the longitudinal direction relative to the valve housing means, and a valve piston means disposed slidably in the bore of the cylinder means along the axis thereof to be urged operatively upon a valve seat of the valve housing means against the resilient force of a valve spring means under the effect of operating fluid pressure fed to the valve cylinder means, while the valve means is opened away from its valve seat with the resilient force of the valve spring means, when the operating fluid pressure is opened to the atmosphere. As the valve piston means stops abutting upon the end wall surface of the valve cylinder means, the current position of the cylinder end wall may determine a current degree of opening of the valve means. This position of the cylinder end wall may be set optionally with an adjustable longitudinal shifting of the valve cylinder means relative to the valve housing means.

4 Claims, 3 Drawing Sheets

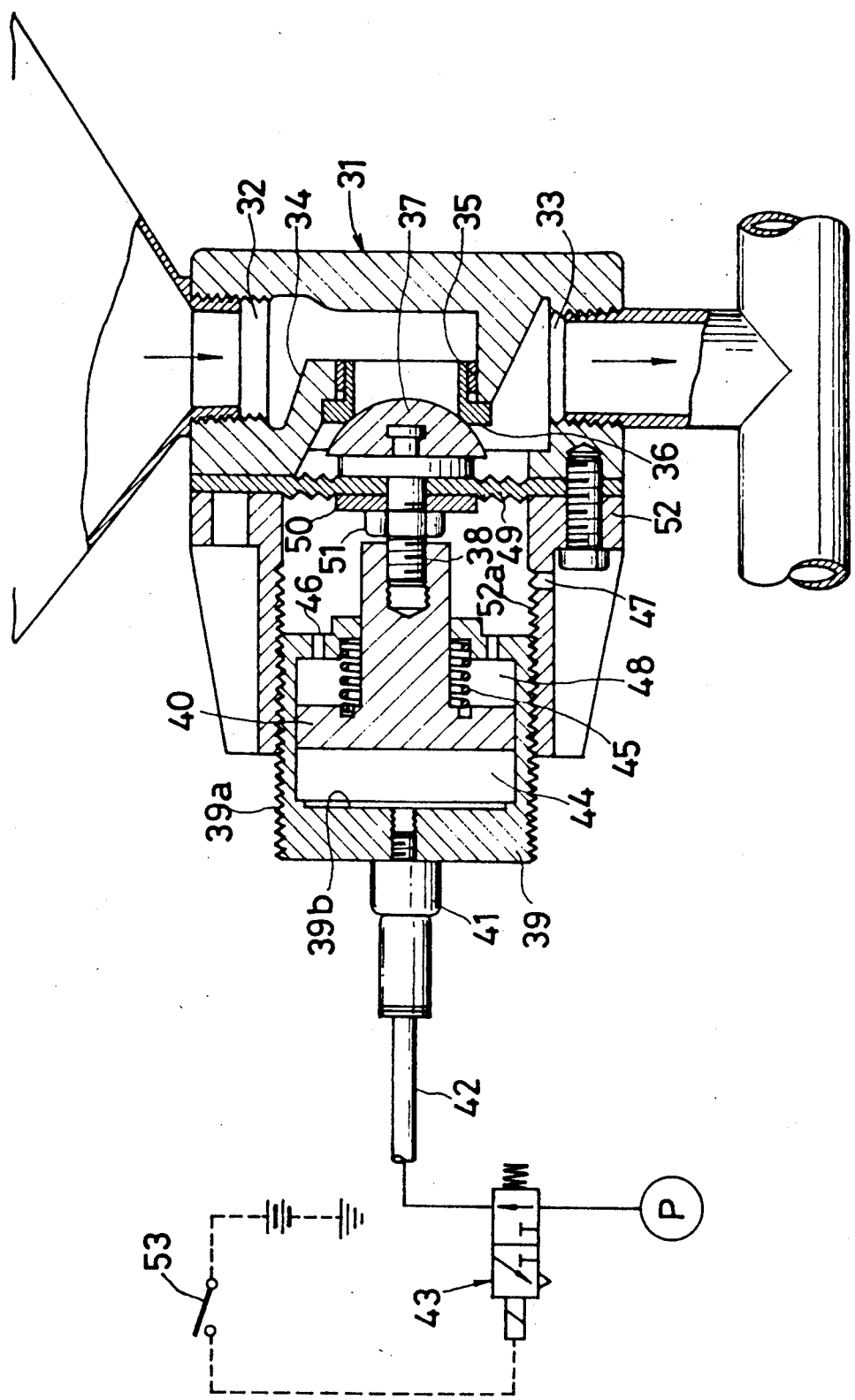

POWDERY ARTICLE SUPPLY VALVE MECHANISM

FIELD OF THE INVENTION AND RELATED ART STATEMENT

The present invention relates in general to a valve mechanism, and more particularly to a valve mechanism as employed in a stock feeder for supplying, for example, abrasive grains from a pressurized storage tank to a blast hose for use in a blast equipment.

Conventionally, the blast equipment has been used commonly in the substrate treatment prior to painting operation or in the casting cleaning operation by using the sand blasting.

FIG. 1 is a longitudinal cross-sectional view showing in section a feeding apparatus for supplying abrasive grains for such operations which are employed in the conventional blasting equipment. In the drawing, it is seen that abrasive grain A is firstly led outwardly through an outlet 02 to a butterfly valve 03, at which it is metered at an appropriate flow rate and then is fed downwardly by gravity force into piping 04, by which it is fed further to a nozzle 05 to be blown out. This butterfly valve 03 is designed to be opened and closed manually or automatically. When it is of a manual type, it may be operated to be opened by using, for instance, a manual switch provided in a control panel, and closed by releasing this operation. With such a manual arrangement, an operator observes a work 06 being positioned in a proper position above the nozzle 05, so that he may manually perform a required operation. For an automatic operation, the nozzle 05 may be provided with a sensor, which functions to detect the work 06 having arrived at a due working position above the nozzle 05, so that the valve 03 may be operated automatically in response to the signal of detection from the sensor to open the valve 03 accordingly.

In such a common arrangement, the butterfly valve 03 is inevitably subjected to heavy wear in use and suffers from entrance or blocking of abrasive grain which may occasionally come between the valve element and its counterpart wall portion. In addition, it may often suffer from such a trouble that fine particles of abrasives would enter and bite into the valve axis to impair a smooth motion thereof.

FIG. 2 is a schematic view showing partly in section the general arrangement of another typical blasting apparatus. According to this arrangement shown in this drawing figure, abrasive grain A held in a storage tank 11 is fed forcedly under the effect of compressive force from an ejector 12 and of suction from an ejector 13, and is also controlled for its metered feed by way of a shut-off valve (gate valve) 14 provided below the storage tank 11. This valve 14 is put under control in a similar manner as the valve 03 shown in FIG. 1. However, this shut-off valve 14 cannot be relieved from drawbacks such that it is not adapted to regulate the flow rate of abrasives A.

FIG. 3 is a general cross-sectional view showing a typical conventional blasing apparatus of suction type which is adapted to shot-blasting operation for substrate treatment as employed prior to the paining operation of a casting product such as a bolt joint for use in the bridge construction. In the drawing, abrasives A stocked in a pressurized tank 21 is ejected under a high pressure of compressed air into a blast gun 24 by way of a blast hose 22, so that it may shoot to grind a work surface 25. After the shot-blasting operation, abrasives A is forced back to a recovery tank 28 through a vacuum hose 27 under the effect of suction air from a blower 26. According to this type of suction blasting apparatus, it is required to adjust the amount of abrasive A by using a regulating valve 29 so that an appropriate amount of abrasives A may be fed accordingly. For instance, in an application that a great volume of abrasives A should be fed in operation, there is inevitably a substantial loss of vacuum in the vacuum hose 27, and this condition may very possibly cause abrasives A to be deposited within the blasting gun 24 resulting in a loss of blasting ability, or cause the abrasives A to be blown out of the gun 24 irregularly. Also, when the grain size of abrasives A is changed during the operation, it would be required to make an additional adjustment of the regulating valve 29 so as to attain a due flow rate thereof accordingly to a new amount of abrasives A required from the change of grain size. However, since this regulating valve 29 is of the type that is adapted to change the extent of opening stepwise in a relatively rough step than required for a fine adjusting grade in flow rate of abrasives A, it is impracticable to meet such a fine adjusting grade with this stepwise regulation of the valve 29.

OBJECT AND SUMMARY OF THE INVENTION

Therefore, it is a primary object of the present invention to provide a powdery material supplying valve mechnism which is adaptable to positively control a required flow rate of abrasive grains to be fed and is adjustable precisely to a required fine degree of adjustment of abrasives.

In an attempt to attain the object as noted above, there is provided an improvement in the powdery article supplying valve mechanism according to the invention, which comprises, as summarized in brief, a piston mechanism adapted for control of the flow rate of powdery material to positively urge a valve element in position to its seat under the effect of fluid pressure against the reaction force of a resilient spring, and a cylinder member of the cylinder/piston mechanism adapted to shift back and forth relatively to the piston element in compensation of a working stroke of the piston element.

With this advantageous arrangement of the improved powdery article supply mechanism according to the present invention, it is possible in practive to accomplish a positive control of the flow rate of powdery material by the effect of compressive action of the piston element and of the reaction force of the spring, as well as a precise fine adjustment of the flow rate of powdery material by the effect of a shifting motion of the cylinder element relative to the piston element of the cylinder/piston mechanism, accordingly.

As a consequence, therefore, there is attained an advantageous effect such that a proper amount of abrasive grains may be supplied with consistency and stability during the blasting operation without the possibilities of blocking or failure of a valve mechanism involved in the blasting apparatus.

BRIEF DESCRIPTION OF THE DRAWINGS

FIG. 4 is a longitudinal cross-sectional view showing, an abrasive grain supply valve mechanism which is improved by way of a preferred embodiment of the present invention.

DETAILED DESCRIPTION OF PREFERRED EMBODIMENTS

Figure 1:
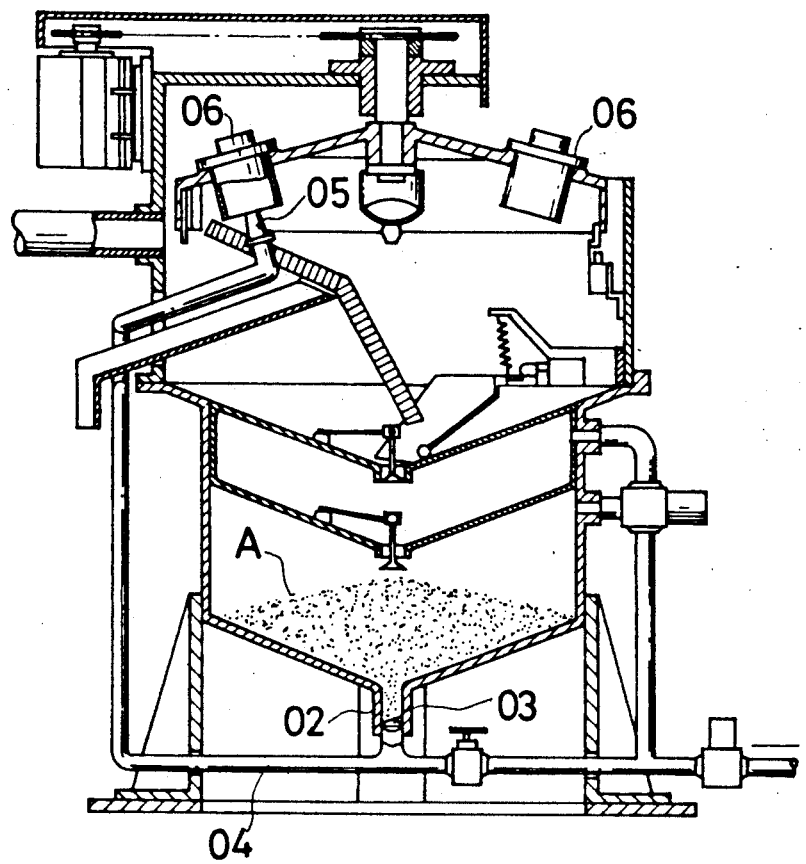
FIGS. 1 through 3 are cross-sectional views showing the constructions of main elements involved in the typical conventional blasting arrangement.
Figure 2:
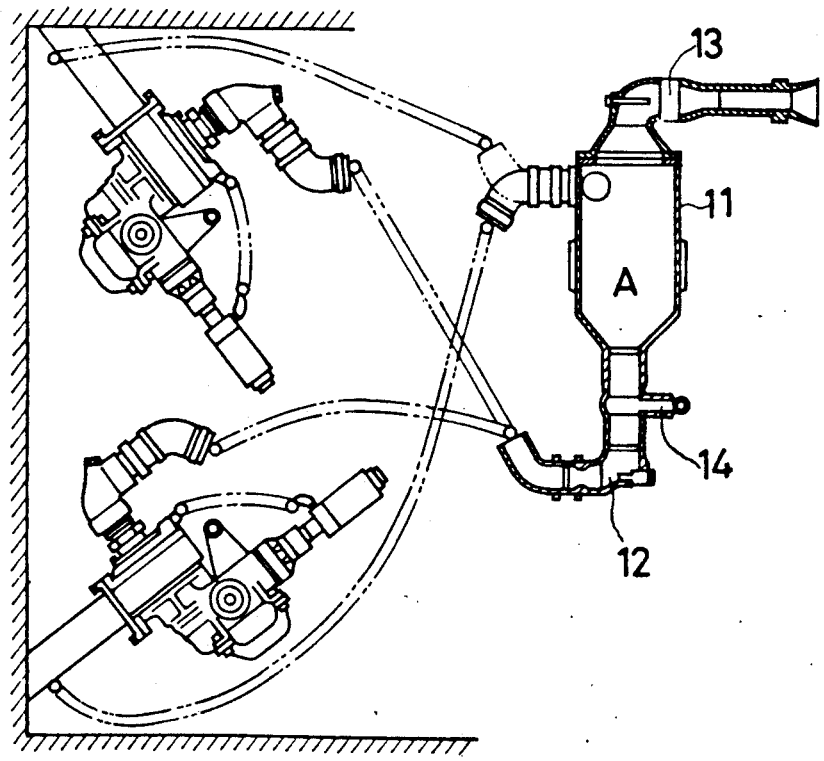
Figure 3:
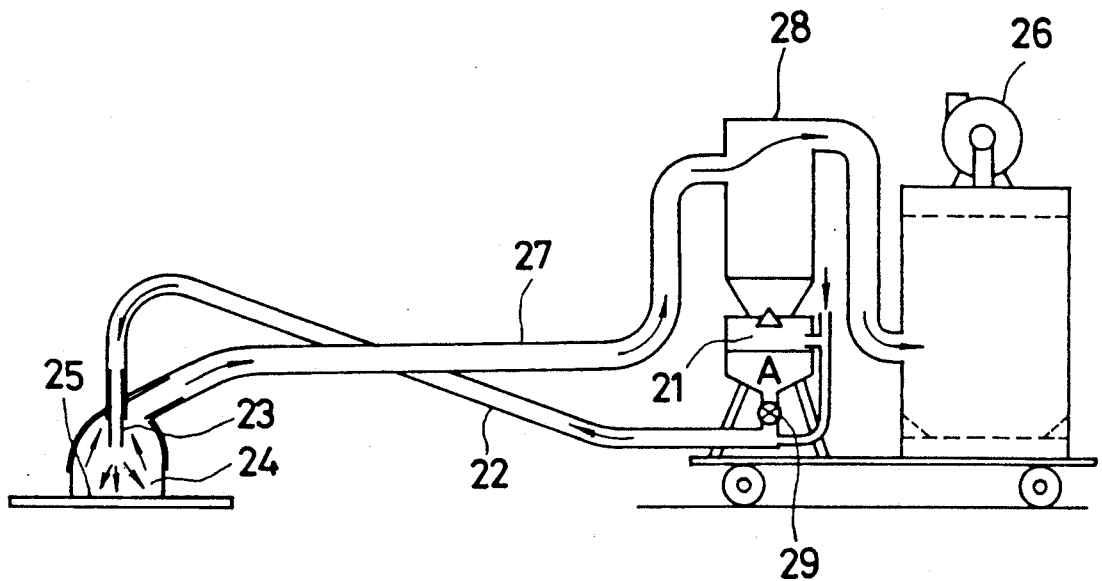

FIG. 4 is a longitudinal cross-sectional view showing, by way of a preferred embodiment of the present invention, an abrasive grain supply valve mechanism, in which drawing figure an abrasive grain supply valve mechanism in accordance with the present invention is seen provided with an inlet opening 32 in the upstream of and an outlet opening 33 of a valve mechanism proper or assembly 31. At the center of a partition wall 34 provided to separate the inlet opening 32 and the outlet opening 33 from each other, a central valve hole or port 35 is defined, into which there is inserted a valve seat 36 for receiving snugly a valve element 37. The valve element 37 is made of an elastomer or resilient material, and adapted to seat closely upon the valve seat 36 so that it may positively block the flow of the abrasives A during the operation. The valve element 37 is operatively connected to a valve piston 40 through a valve rod 38, which valve piston is placed slidably within the bore of a valve cylinder 39. There is connected pneumatic or pressurized air piping 42 at one end thereof in communication with the bore of the valve cylinder 39 by way of a swivel joint 41, by which operating air is supplied under pressure from a compressed air supply P connected to the opposite end of the air piping 42 into the valve cylinder 39 through an air shift valve 43. With this arrangement, when compressed air is fed into the valve cylinder 39, there is filled air under pressure into a space or pressure chamber 44 of the valve cylinder 39 which is defined by the valve piston 40, which air now works to urge the valve piston 40 towards the valve element 37 so that it may bias the valve element 37 closely upon the valve seat 36 to then block out the supply flow of the abrasives A, accordingly.

For starting the supply of abrasives A, the air shift valve 43 is closed firstly to stop the supply of operating air under pressure from the air supply P, and then compressed air in the pressure chamber 44 urging the valve piston 40 is discharged from the air shift valve 43 to the atmosphere. Then, the valve piston 40 is forced back towards the left as viewed in the figure under the tensile force of a valve spring 45 which is disposed within the bore of the valve cylinder 39 so that the valve element 37 may be caused to move away from the valve seat 36 to start the supply of abrasives A passing downwardly. There are defined two holes or openings 46, 47 in the valve cylinder 39 for the purpose of letting atmospheric air out or into an atmospheric chamber 48 defined behind the valve piston 40 in the cylinder 39, so that the valve piston 40 may readily be shifted back and forth with a less resistance in the bore of the valve cylinder 39.

During the operation, there may occasionally be deposited fine particles of abrasives A upon the sliding surfaces of the valve piston 40 and the valve cylinder 39, which would cause accelerated wear of such working surfaces of the valve components or cause biting of abrasives A into these working surfaces, thus impairing or retarding the smooth movement of the valve piston 40 and thus rendering possible causes of malfunction or failures in valving operation. For this reason, the entrance of abrasives A into the bore of the valve cylinder 39 should be prevented positively by a certain effective means. In this respect, there is provided a dust cover element 49 in the working center of the valve cylinder as a useful countermeasure to prevent this problem. According to the preferred embodiment shown, the dust cover element 49 is held operatively like a flexible diaphragm in the center of the valve cylinder bore in such a manner that it is sandwiched rigidly between a valve body 31 and a valve front cover 52 by using a securing nut 51 through a washer 50, and so that it may well follow in expansion the longitudinal motion of the valve rod 38 during the valving operation.

In addition, according to the invention, there is provided a useful function of fine adjustment which allows a fine adjustment of the flow rate of abrasives A. More specifically, there is provided external threads 39a in the outer circumference of the valve cylinder 39 to be engageable threadedly with internal threads 52a formed in the leading end of the valve front cover 52. With this specific arrangement, when rotating manually the valve cylinder 39 relatively to the front cover 52, the cylinder 39 may be shifted back and forth along the center of the valve assembly by the mutual engagement between the threads 39a and 52a in such a manner that the gap or distance from the front end wall 39b of the pressure chamber 44 to the front end surface of the valve piston 40 may be increased or decreased in adjustable continuation. With such adjusting motion, the current extent of shifting of the piston 40 with respect to the valve cylinder 39 may be defined finely, which may immediately bring the fine adjustment of a gap between the valve seat 36 and the valve element 37, and which may now allow a desired fine adjustment of the flow rate of abrasives A accordingly. In order to prevent possible twisting of the air supply piping 42 which is connected to the cylinder 39 when it is rotated manually for such adjustment, the swivel joint 41 is provided freeing a following rotational motion of the supply piping.

This valve mechanism is constructed in operative connection with a starting switch 53 disposed in the blasting nozzle or the like of the blasting apparatus in such a manner that compressed air is supplied continuously from the compressed air supply P through the air shift valve 43 to the pressure chamber 44 with the switch 53 of the apparatus being at the non-operating position thereof. Then, the valve piston 40 is caused to be shifted towards the right as viewed in the figure under pressure in the pressure chamber 44, thus having the valve element 37 biased closely upon the valve seat 36. As a consequence, abrasives A is held from being supplied with this closing positioning of the valve element 37.

At the moment the start switch 53 is operated by the operator, the air shift valve 43 will be shifted towards the right as viewed in the figure, whereupon the pressure chamber 44 of the valve cylinder 39 is opened to the atmosphere, and then the valve piston 40 will be shifted towards the left under the urging force of the valve spring 45, which shifting motion will then cause the valve element 37 to be moved away from the valve seat 36. This departing motion of the valve element 37 is stopped with the valve piston 40 abutting against the end wall surface 39b of the valve cylinder 39. In other words, it can be appreciated that the opening of the valve element 37 will be determined with the adjusted position of the end wall 39b, accordingly.

In this manner, the advantageous features of the abrasive grain supply apparatus according to the present invention resides in that there may be attained a positive and reliable blocking of the supply of abrasives A with the provision of the valve element 37 disposed longitudinally opposedly upon the valve seat 36 which is operable to close and open by function of the relative valve piston 40, and that there may also be attained a precise as well as fine adjustment in the flow rate of abrasives A with the relative compensation of the longitudinal shifting of the valve piston 40 relatively to the valve cylinder 39, which is finely adjustable in the relative relationship with the valve element 37 by way of threaded engagement of the fine threads 39a defined in the valve cylinder 39, respectively.

It is to be understood that the appended claims are essentially intended to cover all of such generic and specific features as are particular to the present invention as disclosed herein by way of preferred embodiments, and all statements relating to the scope of the invention, which as a matter of language might be said to fall thereunder.

We claim:

1. A powdery material supply valve mechanism which comprises, in combination,
    a valve mechanism housing having an inlet means for receiving powdery materials operatively connected via a channel to an outlet means for supplying powdery material in a controlled manner;
    a valve body means disposed along said channel operatively adjacent to a piston rod means and in a longitudinally aligned relationship with said piston rod means;
    a valve housing means incorporating operatively said valve body means, said piston rod means, and a valve seat for receiving said valve means therein so as to close said channel; and
    a valve cylinder/piston means comprising a valve cylinder means disposed shiftably in the longitudinal direction relative to said valve housing means, and a valve piston means disposed slidably in the bore of said cylinder means along the axis thereof to be urged operatively upon said valve seat of said valve housing means against the resilient force of a valve spring means disposed within the bore of said cylinder means so that said valve body means selectively controls the flow rate of powdery material passing from said inlet means to said outlet means via said channel upon selective control of said valve body means against said valve seat, said valve cylinder means being shiftable back and forth along the longitudinal axis of said valve means so that the position of said valve body means may be adjusted finely to determine a relative working stroke of said valve piston means with respect to said valve cylinder means, said valve cylinder means being threadably engaged with said valve housing means so that said valve cylinder means is shifted by being rotated longitudinally relative to said valve housing means and said valve housing means further including a dust cover means disposed above said valve body means along said channel which prevents powdery material from escaping from said channel and entering said valve cylinder/piston means, said valve cylinder means further comprises a pressure chamber disposed between said valve piston means and an end wall in the bore of said cylinder means, and wherein said valve mechanism further comprises a fluid supply means operatively connected to said pressure chamber for supplying fluid thereinto so as to force said valve piston means in a longitudinal direction thereby urging said valve body means against said valve seat, said fluid supply means further comprises a fluid supply pipe in fluid communication with said pressure chamber and a swivel joint operatively associated with said fluid supply pipe such that said valve cylinder means may be rotated without rotating said fluid supply pipe.

2. The powdery material supply valve mechanism as claimed in claim 1, wherein said dust cover is a flexible diaphragm.

3. The powdery material supply valve mechanism as claimed in claim 1, wherein said dust cover is a flexible diaphragm.

4. The powdery material supply valve mechanism as claimed in claim 1, wherein said fluid supply means supplies pressurized air to said pressure chamber.

* * * * *